(12) United States Patent
Jia et al.

(10) Patent No.: US 10,208,918 B2
(45) Date of Patent: Feb. 19, 2019

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Lili Jia, Beijing (CN); Xiuyun Chen, Beijing (CN); Qing Ma, Beijing (CN); Daekeun Yoon, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 14/437,179

(22) PCT Filed: Aug. 27, 2014

(86) PCT No.: PCT/CN2014/085278
§ 371 (c)(1),
(2) Date: Apr. 20, 2015

(87) PCT Pub. No.: WO2015/139423
PCT Pub. Date: Sep. 24, 2015

(65) Prior Publication Data
US 2016/0047523 A1    Feb. 18, 2016

(30) Foreign Application Priority Data

Mar. 19, 2014 (CN) .......................... 2014 1 0103224

(51) Int. Cl.
*F21V 3/04* (2018.01)
*F21S 8/00* (2006.01)
(Continued)

(52) U.S. Cl.
CPC ................ *F21V 3/049* (2013.01); *F21S 8/00* (2013.01); *F21V 5/08* (2013.01); *G02B 27/22* (2013.01);
(Continued)

(58) Field of Classification Search
CPC ... F21V 3/049; F21V 5/08; F21S 8/00; G02B 27/22; G02B 27/2214
(Continued)

(56) References Cited

U.S. PATENT DOCUMENTS

2010/0027113 A1   2/2010  Shin et al.
2010/0079584 A1*  4/2010  Sung .................. G02B 27/2214
                                                            348/52
(Continued)

FOREIGN PATENT DOCUMENTS

CN     102032528 A    4/2011
CN     202835011 U    3/2013
(Continued)

OTHER PUBLICATIONS

First Office Action regarding Chinese application No. 201410103224.5, dated Aug. 21, 2015. Translation provided by Dragon Intellectual Property Law Firm.
(Continued)

*Primary Examiner* — Anh Mai
*Assistant Examiner* — Jessica M Apenteng
(74) *Attorney, Agent, or Firm* — Harness, Dickey & Pierce, P.L.C.

(57) ABSTRACT

The present disclosure provides a backlight module and a display device. The backlight module includes a plurality of first light sources and a diffusion plate. In a 3D display mode, the first light sources belong to different scanning areas, each of which corresponds to a display area. The backlight module further includes a barrier structure provided corresponding to the respective scanning areas and configured to prevent light emitted by first light sources in the scanning areas other than a current scanning area from entering into a display area corresponding to the current scanning area. In the backlight module of the present dis-
(Continued)

closure, the barrier structure is provided corresponding to each scanning area, which can prevent light emitted by first light sources in other scanning areas from entering into the display area corresponding to the current scanning area.

10 Claims, 3 Drawing Sheets

(51) Int. Cl.
  *F21V 5/08* (2006.01)
  *G02B 27/22* (2018.01)
  *G02F 1/13357* (2006.01)
  *G09G 3/34* (2006.01)
  *G09G 3/00* (2006.01)

(52) U.S. Cl.
  CPC ....... *G02B 27/2214* (2013.01); *G02F 1/1336* (2013.01); *G09G 3/003* (2013.01); *G09G 3/34* (2013.01)

(58) Field of Classification Search
  USPC ................ 362/97.1–97.4, 600–634
  See application file for complete search history.

(56) References Cited

U.S. PATENT DOCUMENTS

| | | | | |
|---|---|---|---|---|
| 2010/0265275 | A1* | 10/2010 | Pijlman | G02F 1/133611 345/690 |
| 2014/0078274 | A1* | 3/2014 | Kroon | G02B 27/2214 348/59 |

FOREIGN PATENT DOCUMENTS

| | | |
|---|---|---|
| CN | 203115725 U | 8/2013 |
| CN | 203413449 U | 1/2014 |
| CN | 103562777 A | 2/2014 |
| CN | 103899989 A | 7/2014 |
| CN | 203744036 U | 7/2014 |
| JP | 2007507071 A | 3/2007 |
| JP | 2012104266 A | 5/2012 |
| KR | 20120041039 A | 4/2012 |

OTHER PUBLICATIONS

Written Opinion of the International Searching Authority for international application No. PCT/CN2014/085278.

* cited by examiner

BACKLIGHT MODULE AND DISPLAY DEVICE

CROSS-REFERENCE TO RELATED APPLICATION

This application is the U.S. national phase of PCT Application No. PCT/CN2014/085278 filed on Aug. 27, 2014, which claims a priority of the Chinese patent application No. 201410103224.5 filed on Mar. 19, 2014, which is incorporated herein by reference in their entireties.

TECHNICAL FIELD

The present disclosure relates to the field of display technology, in particular to a backlight module and a display device.

BACKGROUND

In a time-division three-dimensional display (3D display technology, such as SG 3D and Real D), it is needed to cooperate with scanning of a backlight source to achieve a high-quality display. A common practice is to divide the backlight into a plurality of scanning areas, each of which is provided with a plurality of light sources. The light sources in a same scanning area have same turning-on and turning-off time, to ensure that the turning-on time of the light sources in each scanning area matches the display of the panel and the light sources in corresponding scanning areas are turned off after the completion of the display.

For an edge type backlight source, a lens type diffusion plate is used as a light guiding plane, which can effectively control the transmission directivity of the light sources in the scanning area. For a conventional direct type backlight source, as shown in FIGS. 1 and 2, first light sources 1 are distributed in an array manner and disposed on a side of a diffusion plate 2. When performing 3D display, scanning areas A, B and C are defined in the backlight module; each scanning area is provided with a plurality of the first light sources 1. When the first light sources in the scanning area A are turned off and the first light sources in other scanning areas B and C emit light, the light from the scanning areas B and C may enter into a display area corresponding to the scanning area A, thereby affecting the display quality of the display area corresponding to the scanning area.

When the existing direct type backlight source performs 3D display, the existing direct type backlight source cannot effectively control the crosstalk, thereby affecting the quality of 3D display.

SUMMARY

In order to solve the above technical problems that the existing backlight source cannot effectively control the crosstalk when performing 3D display, thereby affecting the quality of 3D display, the present disclosure provides a backlight module, including a plurality of first light sources and a diffusion plate, wherein in a 3D display mode, the plurality of first light sources is distributed in different scanning areas, each of the scanning areas corresponds to a display area, the backlight module further includes a barrier structure provided between adjacent scanning areas and configured to prevent light emitted by the first light sources in the scanning areas other than a current scanning area from entering into the display area corresponding to the current scanning area.

Alternatively, the diffusion plate includes a plurality of light guide areas corresponding to the scanning areas, respectively; and the barrier structure is provided between adjacent light guide areas on the diffusion plate.

Alternatively, the barrier structure is a light blocking surface having a reflective coating.

Alternatively, a recess is defined by one of light blocking surfaces corresponding to the current scanning area and one of light blocking surfaces corresponding to adjacent scanning area.

Alternatively, the recess is a V-shaped structure.

Alternatively, a vertex angle θ of the V-shaped recess is 10°-50°.

Alternatively, the backlight module may further include a quantum material filled in the recess; and a second light source to the recess and configured to generate excitation light to excite the quantum material to emit light.

Alternatively, a density ρ of the quantum material satisfies:

$$\rho = \frac{1}{\rho_0}(D-d)^2\tan\theta,$$

where D is a thickness of the diffusion plate, d is a distance between a bottom of the recess and the diffusion plate and $\rho_0$ is a constant.

Alternatively, the backlight module may further include: a driving module, for switching between 2D and 3D display modes, wherein in the 2D display mode, the driving module drives the second light sources in all the scanning areas to emit light; and in the 3D display mode, the driving module turns off the second light source corresponding to the current scanning area when the first light sources in the current scanning area are turned off.

Alternatively, the second light source includes a blue LED light source.

Alternatively, the driving module is further configured to drive the first light sources in each of the scanning areas to emit light.

The present disclosure further provides a display device, including the above backlight module.

The beneficial effects of the present disclosure are as follow. In the backlight module according to the present disclosure, the barrier structure is provided corresponding to each scanning area, which can prevent light emitted by first light sources in other scanning areas from entering into a display area corresponding to the current scanning area. Therefore, an amount of light entering into scanning areas in which light sources are turned off from scanning areas in which light sources are turned on when scanning the backlight source in the 3D display is reduced, thereby reducing the crosstalk in the 3D display and improving the quality of stereoscopic display.

DETAILED DESCRIPTION

In order to make the technical problem to be solved, technical solutions and advantages of the present disclosure more clear, a detailed description will be given hereinafter in conjunction with the accompanying drawings and embodiments. Obviously, the described embodiments are merely parts of embodiments of the present disclosure, but not all the embodiments. Based on the described embodiments of the present disclosure, all other embodiments obtained by a person skilled in the art without creative work will fall within the protection scope of the present disclosure.

Figure 1:
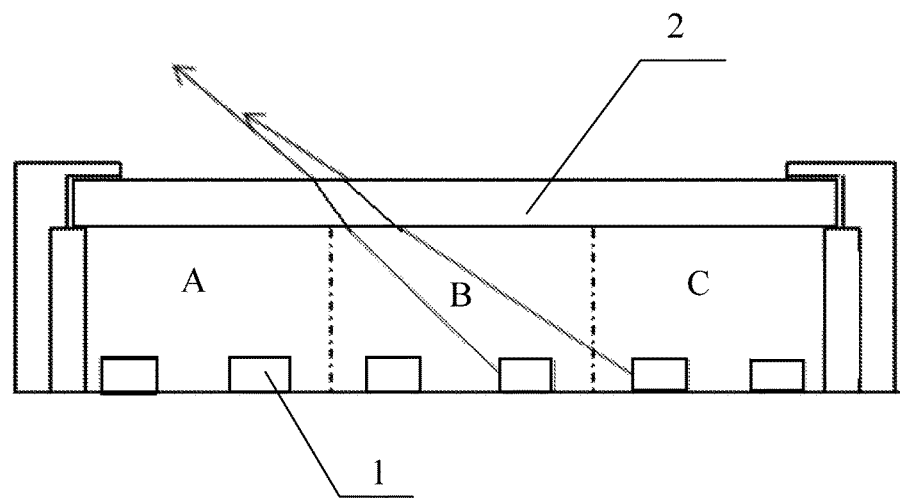
FIG. 1 is a schematic diagram showing a structure of an existing backlight module.
Figure 2:
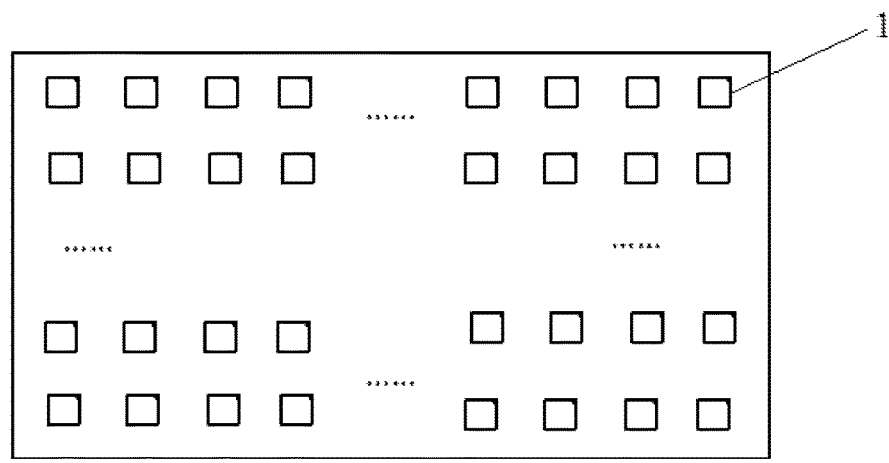
FIG. 2 is a top view showing a distribution of light sources of the existing backlight module.
Figure 3:
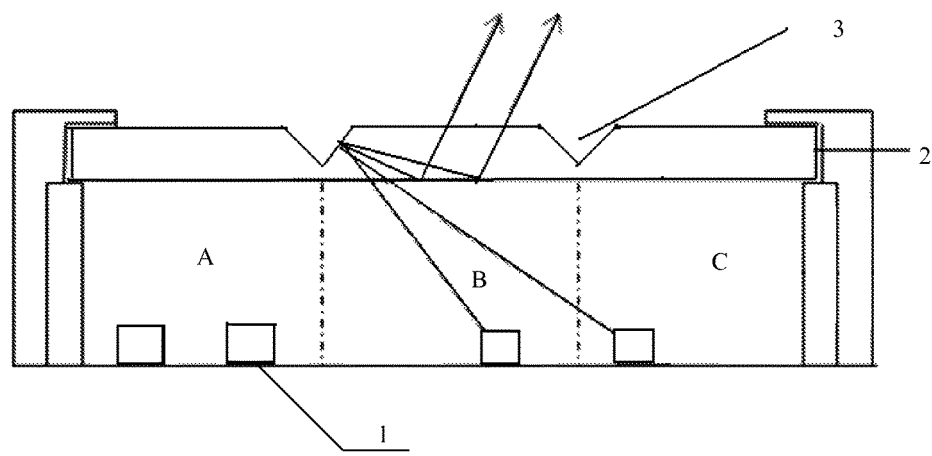
FIG. 3 is a schematic diagram showing a backlight module according to a first embodiment of the present disclosure.

As shown in FIG. 3, which is a schematic diagram (left view) showing a backlight module according to one embodiment of the present disclosure, the backlight module is applied in a 2D/3D display device. The backlight module of the present embodiment includes a plurality of first light sources 1 and a diffusion plate 2. The first light sources are distributed in an array manner (as shown in FIG. 2). In a 3D display mode, the plurality of first light sources 1 is distributed in different scanning areas. Each of the scanning areas corresponds to a light guide area on the diffusion plate and corresponds to a display area. The backlight module further includes a barrier structure 3 provided between adjacent scanning areas and configured to prevent light emitted by first light sources in the scanning areas other than a current scanning area from entering into a display area corresponding to the current scanning area. In the 3D display mode, a three-dimensional display is achieved by scanning the backlight source. The light sources in a same scanning area have same turning-on and turning-off time, to ensure that the turning-on time of the light sources in each scanning area matches the display of the panel.

In the backlight module according to the present disclosure, the barrier structure is provided corresponding to each scanning area. The barrier structure may prevent light emitted by first light sources in other scanning areas from entering into the display area corresponding to the current scanning area. When scanning the backlight source during 3D display, an amount of light entering into scanning areas in which light sources are turned-off from scanning areas in which light sources are turned-on, is reduced, thereby reducing the crosstalk during 3D display and improving the quality of stereoscopic display.

Referring to FIG. 3, the backlight module in the present embodiment includes scanning areas A, B and C, and it is obvious that the number of the scanning areas is not limited to three and may be more than three, preferably, more than eight. The scanning areas extend along one direction, which may be a horizontal direction or a vertical direction. Each scanning area is provided correspondingly with at least one first light source 1. The number of the scanning areas relates to a driving frequency of the panel and a response speed of liquid crystal. In a current time-division 3D display, a driving frequency is 120 Hz, the number of scanning areas is eight or more. When performing 3D display, the scanning areas of the backlight source are turned on or off in a way of matching a panel display signal. When the panel is driven at 120 Hz, the eight scanning areas of the backlight source need to be turned on and off in turn in a cycle of 8.33 ms, so as to finish one scanning cycle. In FIG. 3, the light sources in scanning area A are turned off, while the light sources in the scanning areas B and C are turned on. The display area of the display panel corresponding to the scanning area A has finished displaying a current image and proceeds to a preparing state for a next image, while the display areas corresponding to the scanning areas B and C proceed to display a current image. A barrier structure 3 is provided correspondingly for the scanning area A, to prevent light emitted by the light sources in scanning areas B and C from entering into the display area corresponds to the scanning area A. This may effectively prevent the influence on the current image display caused by the display area A when the display area A is in a stage of gradually proceeding to a next image, thereby improving the display quality.

In the present disclosure, the barrier structure may be any structure which may prevent light emitted by light sources in other adjacent or spaced scanning areas rather than the current scanning area from entering into the display area corresponding to the current scanning area, so as to avoid the interference in the display area corresponding to the current scanning area caused by the light emitted from other scanning areas, thereby improving the quality of stereoscopic display. In the present embodiment, the barrier structure preferably is a light blocking surface having a reflective coating and provided between a light guide area corresponding to the current scanning area and an adjacent light guide area, so as to prevent light emitted by light sources in other adjacent or spaced scanning areas rather than the current scanning area from entering into the display area corresponding to the current scanning area.

Figure 4:
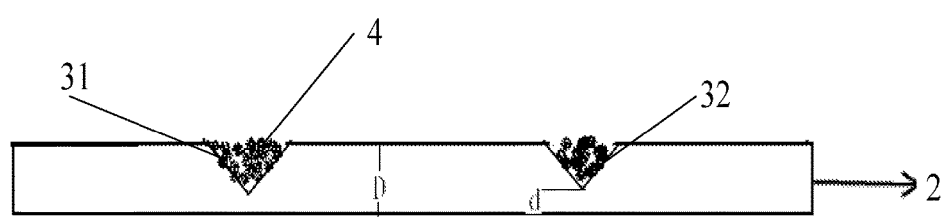
FIG. 4 is a sectional view showing a diffusion plate according to one embodiment of the present disclosure.

As shown in FIG. 4, which is a schematic diagram showing a diffusion plate according to one embodiment of the present disclosure, the barrier structure of the present embodiment is formed between adjacent light guide areas. As shown in the figure, the barrier structure for the scanning area B includes a first light blocking surface 31 and a second light blocking surface 32. The first light blocking surface 31 prevents light emitted by light sources in a first side including the scanning area A from entering into the display area corresponding to the scanning area B. The second light blocking surface 32 prevents light emitted by light sources in a second side including the scanning area C from entering into the display area corresponding to the scanning area B. Since the light from the scanning areas on two sides of the scanning area B cannot enter into the display area corresponding to the scanning area B, thus the crosstalk during the 3D display is avoided.

Referring to FIG. 4, a recess is defined by one of light blocking surfaces in the diffusion plate corresponding to the current scanning area and one of light blocking surfaces corresponding to an adjacent scanning area. The recess is defined between light guide areas corresponding to the adjacent scanning areas. The recess may be a V-shaped, U-shaped or other shaped structure. In the present embodiment, the recess defined by the light blocking surfaces is a V-shaped recess. A vertex angle θ of the V-shaped recess may be 10°-50°, preferably, may be 10°-30°. A thickness D of the diffusion plate may be designed as needed, and preferably is 3-6 mm. An opening of the recess is provided in a first end surface of the diffusion plate. A distance between a bottom of the recess and the other end surface of the diffusion plate is referred as d, which may be designed as needed, and preferably is larger than 0.5 mm.

Figure 5:
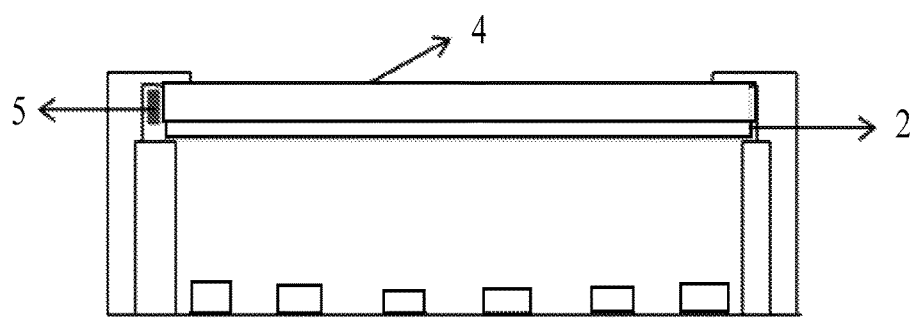
FIG. 5 is a schematic diagram showing a structure of a backlight module according to a second embodiment of the present disclosure.

Since the recess is formed on the diffusion plate, there may be shadows during 2D display, thereby affecting the display quality. Thus, the present disclosure provides a backlight module in a second embodiment. As shown in FIG. 5, the backlight module in the present embodiment is substantially the same as that in the first embodiment, and the difference is that the backlight module in the present embodiment further includes:

a quantum material 4 filled in the recess;

a second light source 5 corresponding to the recess filled with the quantum material and configured to generate excitation light which excites the quantum material to emit light.

Figure 6:
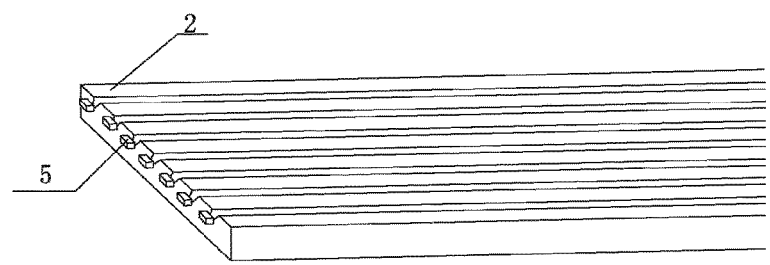
FIG. 6 is a schematic perspective view showing a diffusion plate according to one embodiment of the present disclosure.

In the present embodiment, the quantum material is provided in the recess and is excited by the second light source, which may reduce the shadow formed by the corresponding recess during display. In the present embodiment, the second light sources is provided at an end of the recess and configured to excite the quantum material in the recess. As shown in FIG. 6, seven recesses are defined in the diffusion plate, therefore the diffusion plate is divided into eight scanning areas. The end of each recess is provided with a second light source 5 correspondingly, and light emitted by the second light source may excite the quantum material in the corresponding recess to emit light.

In the present embodiment, the quantum material provided in the recess may be CdS, ZnS and the like. A fluorescence absorption wavelength of the quantum material is 350 nm-400 nm. Since the quantum material is provided in the recess and is capable of emitting fluorescence, thus the shadow formed in the display area by the recess during the 2D display is avoided. The second light source in the present embodiment may be an LED lamp, preferably is a blue LED lamp, so as to excite the quantum material with the absorption wavelength to emit light.

In the present embodiment, a density of the quantum dot material filled in the recess may be set as needed. Preferably, the density $\rho$ of the quantum material provided in the V-shaped recess satisfies:

$$\rho = \frac{1}{\rho_0}(D-d)^2 \tan\theta,$$

where $\rho_0$ is a constant and is a corresponding density of quantum dots when the vertex angle $\theta$ of the recess is 30°, D is a thickness of the diffusion plate, and d is a distance between a bottom of the recess and the diffusion plate.

Figure 7:
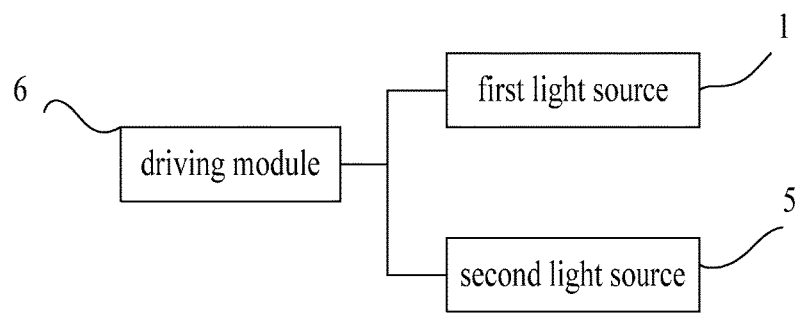
FIG. 7 is a principle diagram of a driving module according to one embodiment of the present disclosure.

As shown in FIG. 7, which is a principle diagram of a driving module according to one embodiment of the present disclosure, the backlight module in the present embodiment further includes a driving module 6, which is configured to drive the second light sources in all scanning areas to emit light in a 2D display mode, and to turn off the second light source corresponding to the current scanning area when the first light sources in the current scanning area are turned off in a 3D display mode. In the 2D display mode, the second light sources in all the scanning areas emit light, thereby avoiding that the recess forms a shadow in the display area. In the 3D display mode, the second light source corresponding to the current scanning area is turned off when the first light sources in the current scanning area are turned off, thereby avoiding that the fluorescence emitted by the second light source in the current scanning area enters into the display area corresponding to the current scanning area, and reducing the crosstalk during the 3D display.

For the backlight module according to the present embodiment, in the 2D display state, by turning on the blue LED and using the quantum material to emit light, a uniform display on the entire display area may be achieved. In the 3D display state, the blue LED is turned on as needed, and the light entering into a scanning area in which light sources are turned off from an adjacent scanning area in which light sources are turned on is reduced, thereby reducing the crosstalk and improving the display quality of the direct type backlight 3D display.

The driving module 6 in the present embodiment is further configured to drive the first light sources to emit light, for example, drive the first light sources in one or more scanning areas to emit light. Therefore, the scanning of the backlight source is achieved to match the 3D display. The backlight module of the present embodiment may further provide a separate second driving module to drive the first light sources to emit light, so as to drive the first light sources in one or more scanning areas to emit light.

The present disclosure further provides a display device. The display device adopts any of the backlight modules described in the above embodiments. The display device may be an LCD panel, an electronic paper, a mobile phone, a tablet computer, a television, a monitor, a notebook computer, a digital picture frame, a navigation system and any other product or component having display features.

The above is only optional embodiments of the present disclosure, it should be noted that several improvements and modifications may be made for those of ordinary skill in the art without departing from the principle of the present disclosure, and also should be considered to fall within the protection scope of the present disclosure.

What is claimed is:

1. A backlight module comprising a plurality of first light sources and a planar diffusion plate, wherein
in a 3D display mode, the plurality of first light sources is distributed in different scanning areas; each of the scanning areas corresponds to a display area; the backlight module further comprises:
a barrier structure, the barrier structure being a light blocking surface having a reflective coating, provided between adjacent scanning areas and configured to prevent, by reflection, light emitted by the first light sources in the scanning areas other than a current scanning area from entering into the display area corresponding to the current scanning area;
wherein a recess is defined by one of light blocking surfaces corresponding to the current scanning area and one of light blocking surfaces corresponding to an adjacent scanning area;
wherein the backlight module further comprises:
a quantum material filling the recess; and
a second light source corresponding to the recess and configured to generate excitation light to excite the quantum material to emit light.

2. The backlight module according to claim 1, wherein the diffusion plate comprises a plurality of light guide areas corresponding to the scanning areas, respectively; and
the barrier structure is provided between adjacent light guide areas on the diffusion plate.

3. The backlight module according to claim 1, wherein the recess is a V-shaped structure.

4. The backlight module according to claim 3, wherein a vertex angle $\theta$ of the V-shaped recess is 10°-50°.

5. The backlight module according to claim 1, wherein a density $\rho$ of the quantum material satisfies:

$$\rho = \frac{1}{\rho_0}(D-d)^2 \tan\theta$$

where D is a thickness of the diffusion plate, d is a distance between a bottom of the recess and the diffusion plate, and $\rho_0$ is a constant.

6. The backlight module according to claim 1, further comprising:
a driving module, for switching between 2D and 3D display modes, wherein in the 2D display mode, the driving module drives the second light sources in all the scanning areas to emit light; and in the 3D display mode, the driving module turns off the second light source corresponding to the current scanning area when the first light sources in the current scanning area are turned off.

7. The backlight module according to claim 6, wherein the second light source comprises a blue LED light source.

8. The backlight module according to claim 6, wherein the driving module is further configured to drive the first light sources in each of the scanning areas to emit light.

9. A display device, comprising the backlight module according to claim 1.

10. A backlight module, comprising:
a plurality of first light sources, the plurality of first light sources in a 3D display mode distributed in different scanning areas, and each of the scanning areas corresponding to a display area;
a diffusion plate;
a barrier structure, the barrier structure being a light blocking surface having a reflective coating, provided between adjacent scanning areas and configured to prevent light emitted by the first light sources in the scanning areas other than a current scanning area from entering into the display area corresponding to the current scanning area, one of the light blocking surfaces corresponding to the current scanning area and one of the light blocking surfaces corresponding to an adjacent scanning area defining a recess;
a quantum material, the quantum material filled in the recess; and
a second light source, the second light source corresponding to the recess and configured to generate excitation light to excite the quantum material to emit light.

* * * * *